Nov. 14, 1961    Y. CONAN    3,008,484
SAFETY FLUID PRESSURE PRODUCING DEVICE
Original Filed Jan. 9, 1958
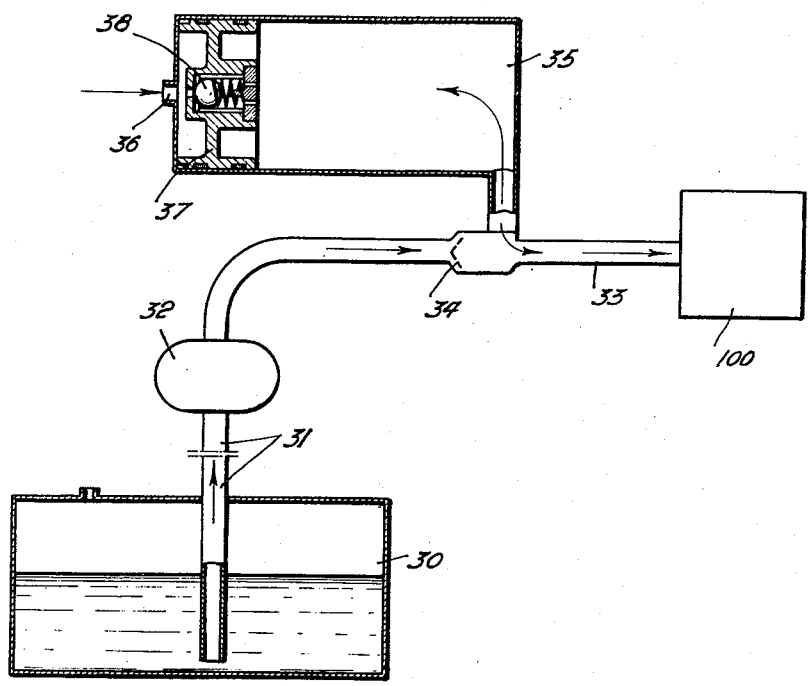
Inventor
YVES CONAN
By Toulmin & Toulmin
Attorneys

United States Patent Office 3,008,484
Patented Nov. 14, 1961

3,008,484
SAFETY FLUID PRESSURE PRODUCING DEVICE
Yves Conan, Enghien, France, assignor to Bronzavia S.A., Courbevoie (Seine), France, a French company
Original application Jan. 9, 1958, Ser. No. 707,998, now Patent No. 2,937,623, dated May 24, 1960. Divided and this application Apr. 14, 1959, Ser. No. 806,348
2 Claims. (Cl. 137—512)

The present invention relates to pressure sources, more particularly for regulators intended to regulate the inlet device controlling the supply of motive fluid to a machine (for example an air turbine) which must rotate at substantially constant speed notwithstanding variations in the load of the machine. Of course the pressure source improved according to the invention may have other applications than the above cited. This application is a divisional application of application Serial No. 707,998, filed January 9, 1958, and now Patent No. 2,937,623.

The pressure source improved according to the invention and which is a real safety fluid pressure producing device is characterized in that it comprises, independently of means supplying liquid fluid under pressure, safety supply means supplying compressed gaseous fluid which automatically come into operation in the event of failure of the liquid fluid supply means.

In a preferred embodiment the liquid supply means supplying liquid to a contrivance to be fed with fluid under pressure, comprise a cylindrical chamber whose one end communicates with the passageway connecting a liquid pump to the said contrivance (at a point located below a check-valve relative to the flow of fluid, which valve is located below said pump), whereas the other end of the cylindrical chamber communicates with a source of compressed gaseous fluid which is at a pressure lower than the normal working pressure of the liquid, a sliding piston being provided in the cylindrical chamber for normally separating the two fluids (liquid and gaseous) from one another and being provided with a valve which puts the two sides of the piston in communication but which only opens in the direction from the gaseous fluid to the liquid fluid.

Further features and advantages of the invention will be apparent from the ensuing description of one embodiment of the new pressure source, with reference to the accompanying drawing, to which the invention is in no way restricted.

The single figure of said drawing is a diagram of the feed means feeding gaseous and liquid motive fluids to the contrivance to be fed with fluid under pressure, for example a regulator.

The arrangement effecting a double feed to the regulator comprises a tank 30 in which extends the inlet pipe 31 of a liquid pump 32 which discharges into the pipe 33 leading to the inlet of the contrivance 100 to be fed.

A check-valve 34 is provided in the pipe 33 below which (with respect to the flow of the fluid) is branch-connected one end of a cylindrical chamber 35 whose other end communicates through a pipe 36 with a source of compressed air (for example, the inlet of an air turbine to be regulated or the compressor of a turbo-jet engine).

Movable in the chamber 35 in a fluid-tight manner is a piston 37 which is provided with a valve 38 allowing communication between the two parts of the chamber on either side of the piston, solely in the direction from the pipe 36 toward the pipe 33.

In normal operation, the oil pressure is higher than the air pressure. The piston 37 is at the extreme left end of the chamber (as viewed in the drawing) and the part of the chamber 35 on the right side of the piston is filled with oil.

When there is a temporary drop in the oil pressure pumped through the supply pipe 33 by the pump 32, the piston 37 is urged toward the right by the compressed air entering through the pipe 36 and the chamber 35 supplies the contrivance 100 with oil under pressure (so long as oil is contained in said chamber 35).

As soon as the oil pressure resumes its original valve, this pressure moves the piston 37 to the left and the part of the chamber 35 on the right side of the piston 37 becomes once more completely filled with oil.

If the duration of the pressure drop in the oil is excessive, the chamber 35 is completely emptied of oil and the piston 37 abuts the right end of the chamber. At this moment the air opens the valve 38 and is fed to the contrivance 100 until the pressure of the oil supply is resumed.

This safety air supply is of particular interest in aircraft in the case of inverted flying.

Although a specific embodiment of the improved pressure source has been described, many modifications and changes may be made therein without departing from the scope of the invention as defined in the appended claims.

What I claim is:

1. A pressure supplying a contrivance with fluid under pressure, comprising a contrivance, a source of liquid under pressure; a pipe for connecting the source to the contrivance; a check valve inserted in the pipe to prevent the liquid from returning to the source; a closed cylindrical container one end of which communicates with the pipe at a point between the check valve and the contrivance; a source of gas at a pressure lower than the normal pressure of the liquid, said source of gas communicating with the other end of the container; a piston slidable in a fluid-tight manner in the container for separating the gas from the liquid; and a valve disposed in the piston for putting both sides of the piston in communication with each other solely in the direction from the gas to the liquid.

2. A safety fluid pressure producing device for delivering fluid under pressure, comprising: a source of liquid under pressure; a delivery pipe connected to the source of liquid; a check valve inserted in the pipe to prevent the liquid from returning to the said source; a closed cylindrical container one end of which communicates with the pipe downstream the check valve; a source of gas at a pressure lower than the normal pressure of the liquid, said source of gas communicating with the other end of the container; a piston slidable in a fluid-tight manner in the container for separating the gas from the liquid; and a valve disposed in the piston for putting both sides of the piston in communication with each other solely in the direction from the gas to the liquid.

References Cited in the file of this patent
UNITED STATES PATENTS
1,958,155     Watkins _____ May 8, 1934
FOREIGN PATENTS
801,512     Great Britain _____ Sept. 17, 1958